United States Patent

[11] 3,624,614

[72] Inventor Donald P. Schulze
La Mirada, Calif.
[21] Appl. No. 871,936
[22] Filed Oct. 28, 1969
[45] Patented Nov. 30, 1971
[73] Assignee C. P. Clare & Company
Chicago, Ill.

[54] SHIFT REGISTER AND DECODER USING SEALED REED SWITCHES
27 Claims, 5 Drawing Figs.

[52] U.S. Cl. .................... 340/172.5, 340/347 DD
[51] Int. Cl. .................... H03k 13/00
[50] Field of Search .................... 340/172.5, 347; 307/216, 221; 328/37, 92, 119; 317/140, 155.5

[56] References Cited
UNITED STATES PATENTS
3,184,734 5/1965 Uren et al. .................... 340/347
3,470,539 9/1969 Proud, Jr. et al. .................... 340/172.5

*Primary Examiner*—Raulfe B. Zache
*Attorney*—Mason, Kolehmainen, Rathburn & Wyss

ABSTRACT: A shift register and decoder controls the operation of a plurality of external devices. Each external device is actuated a predetermined time interval after a code corresponding to the device is presented to the shift register input. The shift register stores the codes and presents them to a plurality of dual winding reed relay decoder circuits, each corresponding to one of the external devices, at approximately the proper times. Each decoder circuit then acts jointly with one of several periodic strobe signals to actuate the corresponding device at precisely the desired time. The decoder circuits erase decoded codes from the shift register, thus reducing the number of codes which can reach the more remote shift register stages and allowing simpler decoder circuits to be associated with the more remote stages.

INVENTOR
DONALD P. SCHULZE
BY Mason, Kolehmainen, Rathburn and Wyss.
ATTORNEYS

INVENTOR
DONALD P. SCHULZE
BY
Mason, Kolehmainen, Rathburn and Wyss
ATTORNEYS

INVENTOR
DONALD P. SCHULZE
By
Mason, Kolehmainen, Rathburn & Wyss
ATTORNEYS

SHIFT REGISTER AND DECODER USING SEALED REED SWITCHES

The present invention relates to decoder circuits and more particularly to decoder circuits utilizing dual winding relays.

To allow the design of very low cost electrical equipment for controlling sorting operations in the material handling field, an extremely simple dual winding reed relay shift register has been developed and is disclosed in an application, Ser. No. 735,262 filed June 7, 1968 by the present inventor and assigned to the same assignee as the present application. To further reduce the cost of such equipment, it would be desirable to design a decoder circuit for decoding information presented by such a shift register. The decoder problem involves the use of the logic AND gate which is expensive to build using relay logic, since either multiple coil or series connected relays are required.

A primary object of the present invention is therefore to design an extremely simple decoding system that utilizes to advantage the features of a dual winding reed relay shift register.

A further object is to design decoding circuits each containing a single relay that can be used with a shift register to decode any arbitrary coding scheme.

Another object of the present invention is to design a shift register decoding circuit that erases information from a shift register when the information is decoded so as to simplify the design of decoding circuits located further on down the shift register.

In accordance with these and many other objects, an embodiment of the invention comprises a plural stage shift register each stage of which is connected to a decoding relay by a decoding circuit so that the decoding relay is energized only when the proper code is presented. In response to presentation of the proper code, the relay acts to prevent a transfer of data from that stage of the shift register to the next, and thereby erases decoded data from the shift register. Since data is eliminated from the shift register at each successive stage, it is not necessary for decoding logic to detect and reject data which has already been erased, so the decoding circuits of succeeding stages become progressively simpler. The resulting decoding structure uses a minimal number of parts and is therefore quite economical to construct.

If the shift register is of the type wherein information is stored in a capacitor while it is transferred from one stage to the next, the decoder relay can erase information by simply preventing the data transfer capacitors from receiving a full charge, and thereby causing an all-zero code to be transmitted.

Each decoding circuit preferably comprises a diode array that can be changed or altered to match the chosen coding scheme. Code numbers having a "1" in the most significant bit position are decoded and erased first, preferably in numerical order. Then code numbers having a "1" in the next most significant bit position are decoded and erased, and the most significant bit is dropped from the shift register and is lost. This process is continued until all code numbers have been decoded and erased. The diode arrays include a minimum of diodes, preferably one for each "0" and one for the most significant "1" bit of each code number. In this manner the shift register and decoder are kept as simple as possible.

The shift register and decoding circuits can be used in conjunction with strobe timing signals to actuate a large number of devices at precisely predetermined time intervals after code numbers corresponding to those devices are fed into the shift register. Such an arrangement is extremely useful, for example, in controlling the actuation of unloading apparatus located alongside a moving conveyor. Code numbers corresponding to locations to which objects on the conveyor are to be routed are fed into the shift register and are advanced through the shift register so that the position of the code numbers within the shift register corresponds to the location of the correspondingly addressed objects on the conveyor. When an object is in the general vicinity of its unloader, the number in the shift register actuates a decoder circuit. When the object is precisely in the unloading zone, the decoding circuit acts together with a timed strobe signal to actuate unloading apparatus which unloads the object from the conveyor. In this manner, a long conveyor including a large number of randomly-spaced unloading locations can be controlled by a single shift register decoder.

Many other objects and advantages of the present invention will become apparent in considering the following detailed description in connection with the drawings in which:

FIGS. 1A and 1B together form a schematic diagram of a shift register and decoding system designed in accordance with the present invention;

Figure 1A:
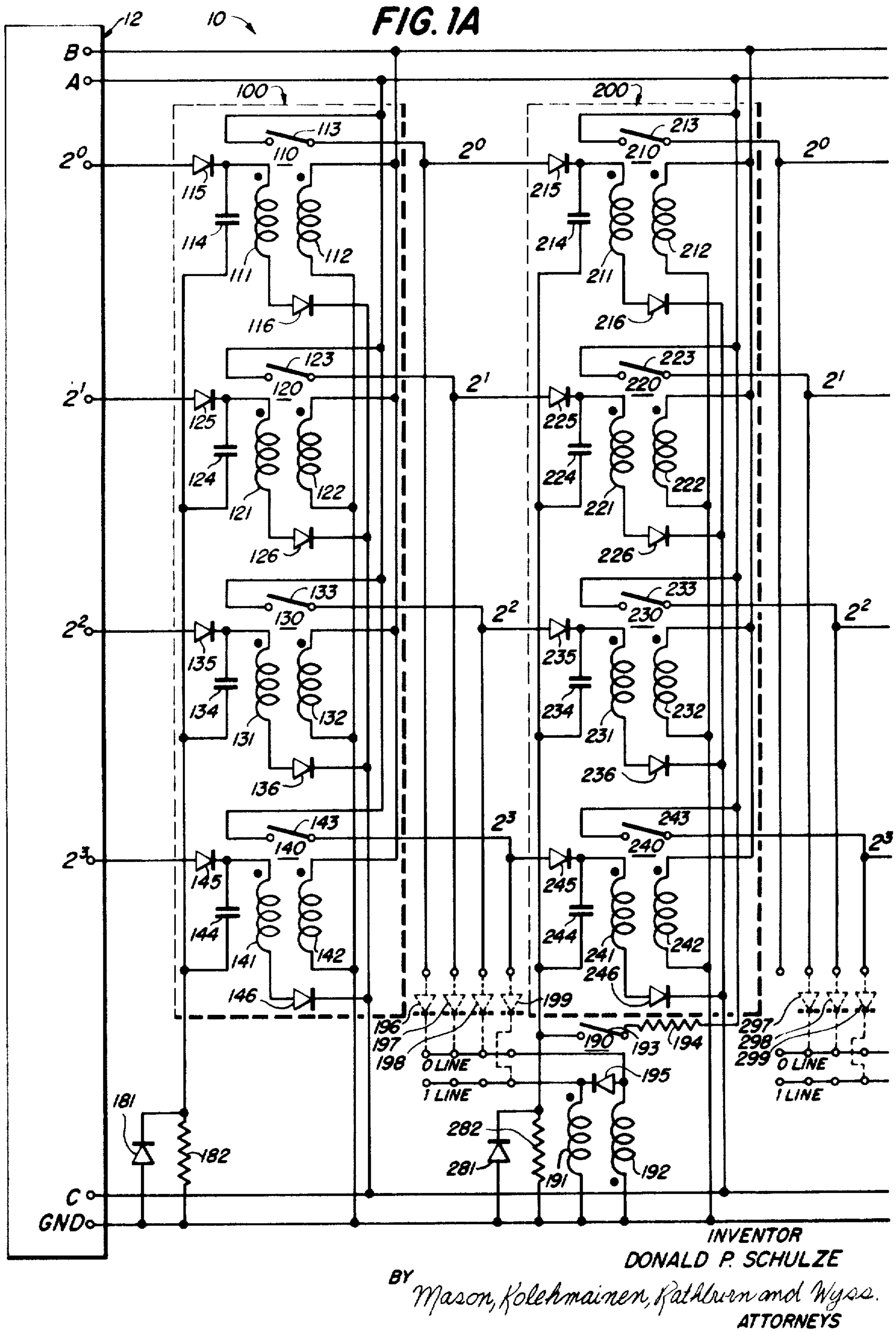
Figures 1B, 2:
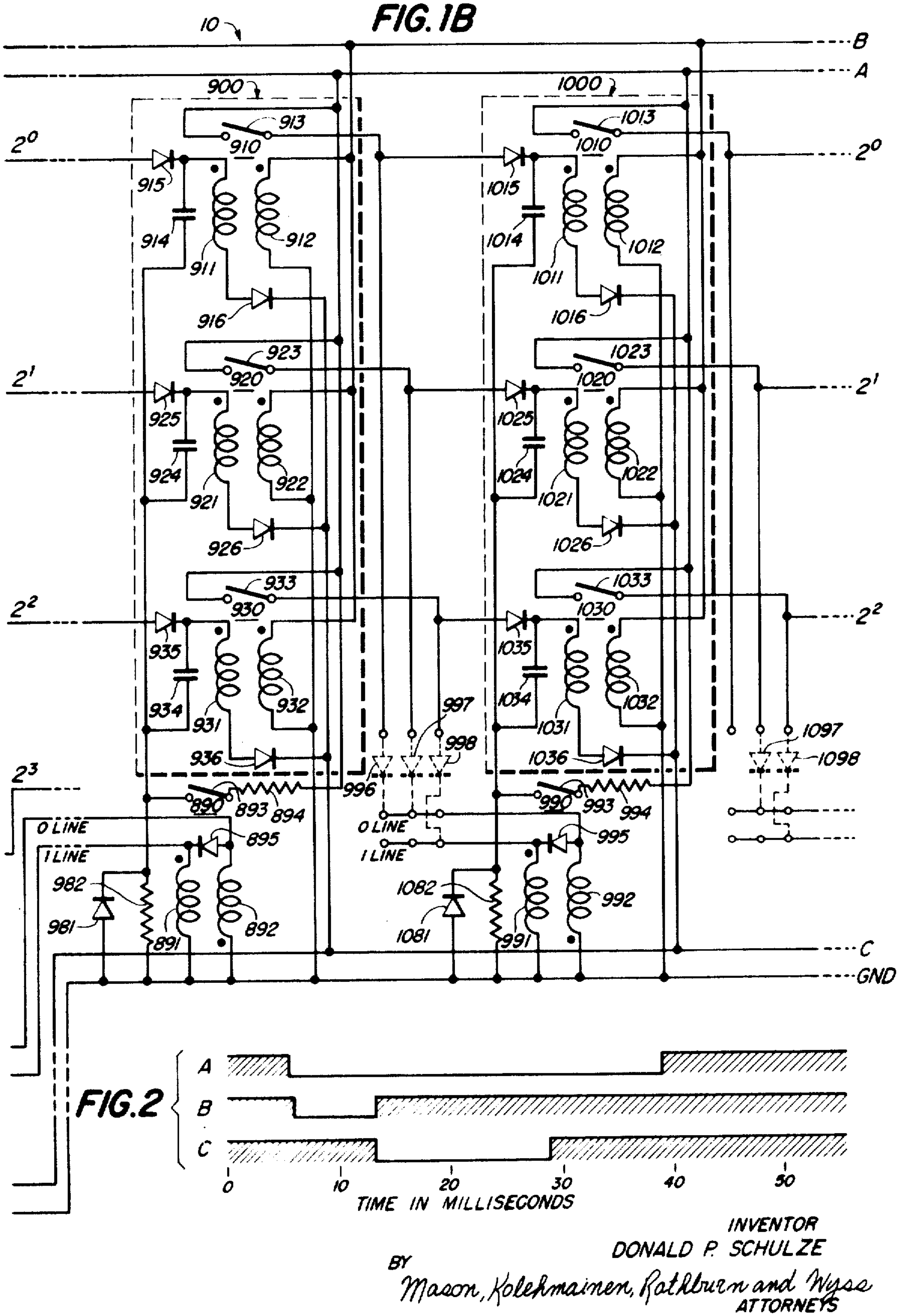
FIG. 2 is a timing diagram of the potentials which are applied to the terminals A, B, and C (FIG. 1A) in order to transfer data through the shift register shown in FIGS. 1A and 1B.

Referring now more specifically to FIGS. 1A and 1B of the drawings, therein is illustrated a shift register decoder indicated generally at 10 and designed in accordance with the present invention. The shift register decoder 10 comprises basically a plurality of multibit storage registers 100, 200, ... 900, 1,000 ... interconnected to form a multibit shift register; and decoder relays 190, ..., 890, 990, ... each having an input connected to the output of a storage register. When the proper code signal appears at the output of a storage register, the associated decoder relay is energized and produces an output signal. This output signal can be used to initiate the operation of an external device such as a sorting or material-handling device. This output signal is also fed to the next successive storage register and prevents the transmission of the code signal to the next group of registers. In this manner, a code signal is erased immediately after it is successfully decoded by one of the decoding relays.

In the preferred embodiment shown in FIGS. 1A and 1B, code signals having a "1" in the most significant bit position are decoded first, and codes having "1"'s in successively less significant bit positions are decoded at successively later stages of the shift register decoder 10. Decoding diodes associated with each decoder relay comprise a decoding circuit that determines exactly what number is decoded by each decoder relay. For example, decoding diodes 196 to 199 cause the decoder relay 190 to be activated by the binary code 1,000 (the binary representation for the decimal number 8). The diodes 297 and 299 cause the next decoder relay (not shown) to be activated by the binary code 1,000 or by the binary code 1,001 (the binary representations for the decimal numbers 8 and 9). Since the binary-code 1,000 is decoded and erased from the shift register by the relay 190, only the code 1,001 can be presented to the diodes 297—299, and hence there is no ambiguity in the decoding process. Since the decoder relay associated with the diodes 297—299 is detecting two out of 16 possible codes rather than one out of 16 possible codes, it requires only three diodes in its decoding circuit. The decoder relay 190 must detect only one out of 16 possible codes, and hence requires four diodes in its decoding circuit. It can be seen that by erasing a number from the shift register after that number is decoded, the decoding circuits in successive shift register stages can be gradually simplified. After all binary codes 1,000 or greater (all decimal code numbers 8 and above) have been decoded, there is no longer any necessity for transmitting data along the $2^3$ data line through the shift register decoder 10. Accordingly, in FIG. 1B only the three data lines $2^0$, $2^1$, and $2^2$ are required. The final data line serves only to distinguish binary codes of 1,000 or greater from codes below 1,000, and serves no useful purpose after all codes 1,000 or greater have been decoded and erased from the shift register decoder.

Storage space for successively fewer bits is thus required in the storage registers further along the shift registers decoder 10. While the registers 100, 200,... require storage space for four bits each, the storage registers 900, 1000, ... require storage space for only three bits each. After all the numbers from binary codes of 100 or greater (decimal 4 or greater) have been decoded, the $2^2$ data line is no longer necessary, and the registers only require storage space for two bits each.

Referring to FIG. 1B, the decoder relay 990 is set up to detect the binary code signal 100 (the binary representation for the decimal number 4). Three diodes are required to detect this code unambiguously. Since the relay 990 erases this code signal from the shift register memory whenever it detects this code signal, the next successive decoder relay is set up to detect the binary code signal 100 and also the binary code signal 101. There is no ambiguity, since all occurrences of the code signal 100 are decoded and erased by the decoder relay 990. This second decoding requires only two detector diodes 1097 and 1098. In an analogous manner, succeeding stages of detectors become simpler and simpler as more and more code signals are erased from the shift register decoder 10.

FIG. 2 shows the signals which are applied to the lines A, B and C to shift data through the shift register decoder 10. All three lines are normally positive. The line B supplies a holding current to a first winding of each relay within each memory storage register. Within the storage register 100, for example, the line B supplies current to a first winding 112 of a relay 110, a first winding 122 of a relay 120, and so on. The opposite terminal of each of these windings is returned to a ground line GND. The current flow through these windings is sufficient to hold each relay in whatever state it happens to be in, but is not sufficient to close a relay that is initially open. Thus, energization of the line B preserves data within the relays but cannot change the state of a relay.

The line A is also normally positive. This line supplies current to all memory storage register relay contacts. If the relay contacts are closed, current is transmitted from the line A through one of the data lines $2^0$, $2^1$, ... and into a data transfer capacitor within a corresponding section of the next sequential storage register. For example, assuming the relay 110 within the storage register 100 is energized, the contacts 113 are closed and allow current to flow from the line A through the $2^0$ data line and a diode 215 into a data transfer capacitor 214. The opposite end of the capacitor 214 is connected to the ground line GND by a resistor 282 which serves as a current-limiting device. In this manner, the capacitor 214 is fully charged. The capacitor 214 is associated with a relay 210 within the storage register 200. Assuming the relay 210 within the storage register 100 is not energized, the contacts 123 are open and no current flows through the $2^1$ data line and through a diode 225 into a capacitor 224. Thus, the capacitor 224 remains discharged.

The first step in transferring data through the shift register decoder 10 is the deenergization of both the lines A and B. Deenergization of the line B deenergizes all of the relays within the decoder 10 and causes all of the relay contacts 113, 123, ..., 213, 223, ..., 913, 923,... to open. At this point in time no information is stored in the relays. The data formerly stored in the relays is now represented by the charge state of the data transfer capacitors 214, 224, ..., 1014, 1024, ... . After a time interval that is sufficient to allow all of the relay contacts to open, the line B is again energized with a positive potential, and simultaneously the line C is energized with a ground level potential. Current from the line B flows through the second coil 112, 122, ..., 212, 222, ... , 912, 922, ... in each relay. Simultaneously, current from the charged buffer capacitors flows through the first coil 111, 121, ... in each relay and through diodes 116, 126, ... to the line C. All relays associated with a charged buffer capacitor are energized by a simultaneous current flow through their first and second windings, and close their respective contacts. For example, the buffer capacitor 214 is charged, so the windings 211 and 212 in the relay 210 are simultaneously energized. They develop sufficient electromagnetic force to close the contacts 213. In relays associated with a buffer capacitor that is not charged, current does not flow through the first winding and sufficient magnetic forces to close the contacts is never developed. Thus, the contacts 223 of the relay 220 remain open. When the buffer capacitors are all fully discharged, current ceases the flow through the first windings 111, 121, ... but continues to flow through the second or holding windings 112, 122, ..., and the relays remain in the new state to which they have been put. In the meantime, no current is allowed to flow through the line A. A current in line A would flow right through the first windings 111, 121, ... of relays adjacent to relays having closed contacts, and would add 1 bits to the data in the shift register. The line A is therefore not reenergized before the line C is disconnected from ground. As shown in FIG. 2, the line C is then disconnected from ground first, and after a short interval the line A is reenergized. Then the buffer capacitors are again recharged in a manner identical to the way in which they were charged previously, and the entire procedure is repeated. By exactly repeating the signals illustrated in FIG. 2, binary numbers are transferred from one storage register to the next through the shift register decoder 10.

Decoding is accomplished by double coil reed relays for example the decoding relay 190 shown at the bottom of FIG. 1A. The decoding relay 190, unlike the shift register relays 110, 120, ..., is designed so that current through either of the windings 191 or 192 can close the contacts 193. However the windings 191 and 192 are wound in a reverse direction from one another so that when current flows simultaneously through both of the windings 191 and 192, the flux generated by the two opposing currents cancel and the contacts 193 remain open. Thus, the decoding relay 190 functions as an EXCLUSIVE OR logic element. The first winding 191 is connected to a line labeled "1 LINE," and the second winding 192 is connected to a line labeled "0 LINE." The relay 190 is intended to decode the binary number 1000, with "1" appearing on the $2^3$ data line, and with "0"'s appearing on the first three data lines. Therefore coding diodes 196 through 198 connect the first three data lines (the ones bearing "0"'s) to the "0 LINE," and a diode 199 connects the $2^3$ data line (the ones bearing the most significant "1") to the "1 LINE." A diode 195 interconnects the coils 191 and 192 in the manner shown, so that its cathode connects the "1 LINE" and its anode connects to the "0 LINE." The function of this diode will be explained below.

The diodes 195 and 199 comprise a two-input OR logic element connected to the "1 LINE," and the diodes 196 through 198 comprise a three-input OR logic element connected to the "0 LINE."

Whenever the binary number "1,000" appears at the output of the storage register 100, the decoding relay 190 is energized. No other number can energize the relay 190. When the binary number "1,000" is present, the contacts 143 are closed and supply a positive potential to the $2^3$ data line, causing a current to flow through the coding diode 199 and the coil 191. This current in the coil 191 energizes the coding relay 190 and closes the contacts 193. If a number greater than "1,000" were present, one or more of the contacts 113, 123, or 133 would be closed and would supply current to the coil 192 through one or more of the diodes 196–198. For example, if the number "1010" were present, the contacts 123 would supply current to the coil 192. This current in the coil 192 would nullify the effect of the current in the coil 191 and would prevent the contacts 193 from closing. If a number less than "1000" but greater than "0000" were present, one or more of the contacts 113, 123, and 133 would again be closed and would supply current through one or more of the diodes 196–198 to both the coil 192 and also through the diode 195 to the coil 191. Again the current in the coil 192 would nullify the effect of the current in the coil 191 and would prevent the contacts 193 from closing. If the number "0000" were present, all of the contacts 113, 123, 133, and 143 would open, and no current would flow to the relay 190. Thus, the contacts 193 close only when the binary number "1000" is present.

Other decoder relays, such as the relays 890 and 990, are similarly connected to detect and to decode other binary numbers. For example, the diodes 996–998 are arranged so that the decoder relay 990 decodes the binary number "100," and the diodes 1097–1098 are arranged so that the next sequential decoder relay (not shown) decodes the binary number "101." In the preferred embodiment shown, all data lines which bear "0"'s when the proper number appears are connected to the decoder relay "0 LINE" by coding diodes, and the most significant data line which bears a "1" when the proper number appears is connected to the decoder relay "1 LINE" by a single coding diode. This particular scheme can be varied, if desired, by selecting some other data line which bears a "1" and connecting it to the decoder relay "1 LINE," or by reversing the roles of the "1" and "0" lines.

The sequence in which data is decoded by the shift register decoder 10 is quite important. For example, the decoder 190 could not be set up to decode "1001" unless earlier decoders had already decoded "1000." This is because the diode arrangement required to decode "1000" can also decode "1000."b Thus, it is necessary to carefully choose the sequence in which numbers are to be decoded so as to not leave the possibility for a single decoder relay to receive two different codes both of which can energize the decoder relay. While there are various sequences of coding and decoding which will work satisfactorily, in the preferred embodiment of the present invention, the following procedure is adhered to.

First, all numbers having a "1" in the most significant bit position are decoded, starting with the smallest and progressing on to the largest, by a first section of the shift register decoder. Then all numbers having a "0" in the most significant bit position but having a "1" in the next most significant position are decoded, again starting with the smallest and progressing to the largest, by a second section of the shift register decoder. Third and fourth sections of the shift register decoder are similarly used to decode third and fourth groups of numbers having "1"'s in a successively less significant bit positions, until all numbers are decoded. This arrangement allows the most significant bit line to be deleted from each successive section of the shift register decoder, as the $2^3$ line is deleted from the decoder 10 between FIG. 1A and FIG. 1B. Decoding is accomplished by connecting the most significant bit data line to the "1 LINE" of each decoder relay, and by connecting all of the data lines carrying "0" bits when the number to be decoded is present to the "0 LINE" of each decoder relay. In this manner, only one diode is used to detect the "1" bit. Fewer and fewer decoder diodes are thus required at successively further stages in each section of the shift register decoder. This is illustrated in FIGS. 1A and 1B.

As a simple example of how the above coding scheme can be embodied, assume that a four-bit code is used to represent 16 different possible code numbers from 0000 through 1111. In accordance with the above discussion, the following order of decoding would be adhered to:

| Storage Register | Number Decoded | Number of Decoder Diodes Required |
|---|---|---|
| 1st | 1000 | 4 |
| 2nd | 1001 | 3 |
| 3rd | 1010 | 3 |
| 4th | 1011 | 2 |
| 5th | 1100 | 3 |
| 6th | 1101 | 2 |
| 7th | 1110 | 2 |
| 8th | 1111 | 1 |
| (Delete most significant bit data line) | | |
| 9th | 100 | 3 |
| 10th | 101 | 2 |
| 11th | 110 | 2 |
| 12th | 111 | 1 |
| (Delete most significant bit data line) | | |
| 13th | 10 | 2 |
| 14th | 11 | 1 |
| (Delete most significant bit data line) | | |
| 15th | 1 | 0 |

The first eight data storage registers must have a four-bit capacity to contain four bits of data, as shown in the table. The ninth through 12th storage registers need only have a three-bit capacity, and the 13th and 14th storage registers only require a two-bit capacity. The last storage register can contain only a single flip-flop, serving both as a storage register flip-flop and also as a decoding flip-flop. Thus, no separate decoder diode or decoder relay is required in the last stage.

The same scheme can be applied using any number of bits. For example, a seven-bit system can be set up to decode seven-bit binary numbers. For maximum cost savings, the number of storage registers and decoder relays should correspond to the number of binary code numbers which are to be used. Thus, if only 11 binary code numbers are required, only 11 data storage registers need be used. In the above list, the fifth through the eighth registers can be deleted, leaving a system capable of decoding 11 different combinations of 4 bits. The system thus includes no more than the absolute minimum of components necessary to decode any required number of binary code numbers.

Figure 3:
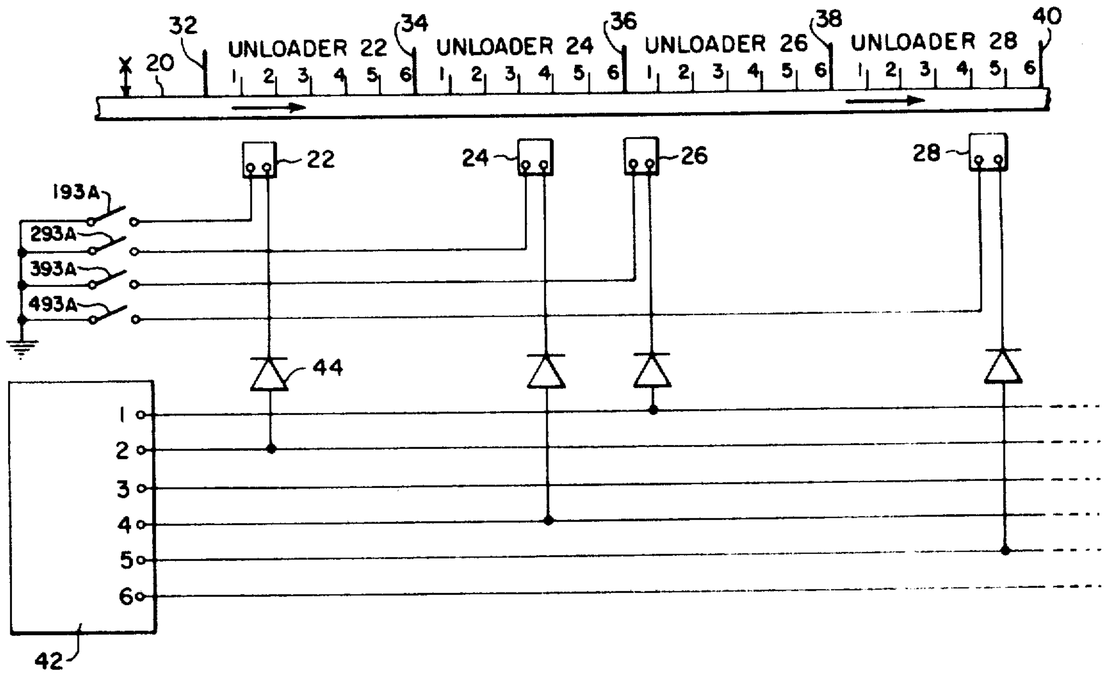
FIG. 3 is a schematic representation of a conveyor unloading arrangement controlled by the present invention.

FIG. 3 shows how the present invention can be used to actuate four unloaders 22, 24, 26, and 28 located at irregular intervals along a conveyor belt 20 which is moving in the direction indicated. When the goods carried by the conveyor belt 20 reach an initial point X, optical scanners (not shown) respond to markings upon the goods and generate a code that is indicative of the unloader to which the goods are to be delivered. This code is presented to the first multibit storage register 100 (FIG. 1A) over the lines $2^0$, $2^1$, $2^2$, and $2^3$. When the goods advance to a position adjacent the heavy line 32, suitable signals are applied to the lines A, B, and C (FIG. 1) to shift the code into the first multibit storage register 100. The generation of the signals A, B, and C is synchronized with movement of the conveyor 20 in such a manner that each time the goods pass a heavy reference line 32, 34 ..., 40, the code within the shift register decoder 10 is advanced forward one stage. Thus, the position of the code within the shift register decoder 10 corresponds to the particular unloader 22, 24, 26, or 28 which the goods are adjacent.

If the code representing the goods indicates that the goods are to be unloaded by the unloader 22, then the coding diodes 196–199 (FIG. 1A) are chosen so that they will actuate the relay 190 and close the switch 193 when this code is within the multibit storage register 100. A switch 193A (FIG. 3) is then arranged to close simultaneously with the closure of the switch 193 (FIG. 1A). The switch 193A supplies a ground level signal to the unloader 22 and causes the goods to be unloaded while opposite the unloader 22. Similar switches 293A, 393A, and 493A are arranged to actuate the unloaders 24, 26, and 28 when appropriate decoding relays indicate that goods which are to be unloaded by these unloaders are properly positioned. In this manner, the shift register decoder 10 can keep track of all goods carried by a conveyor, and can cause those goods to be unloaded when they are adjacent the proper unloading stations.

The unloaders 22–28 shown in FIG. 3 are not spaced at uniform intervals, but are more or less randomly arranged along the conveyor 20. While the shift register decoder 10 can actuate the proper unloader when the goods are within range of that unloader, the shift register decoder 10 does not tell an unloader when the goods are directly opposite the unloader, but rather merely indicates that goods which are to be unloaded are within a zone that includes the unloader. It is therefore necessary to provide timing signals or strobe signals which are also generated synchronously with the motion of the conveyor 20 and which can actuate each of the unloaders 22–28 at the exact moment when goods are positioned directly opposite the unloaders.

Figure 4:
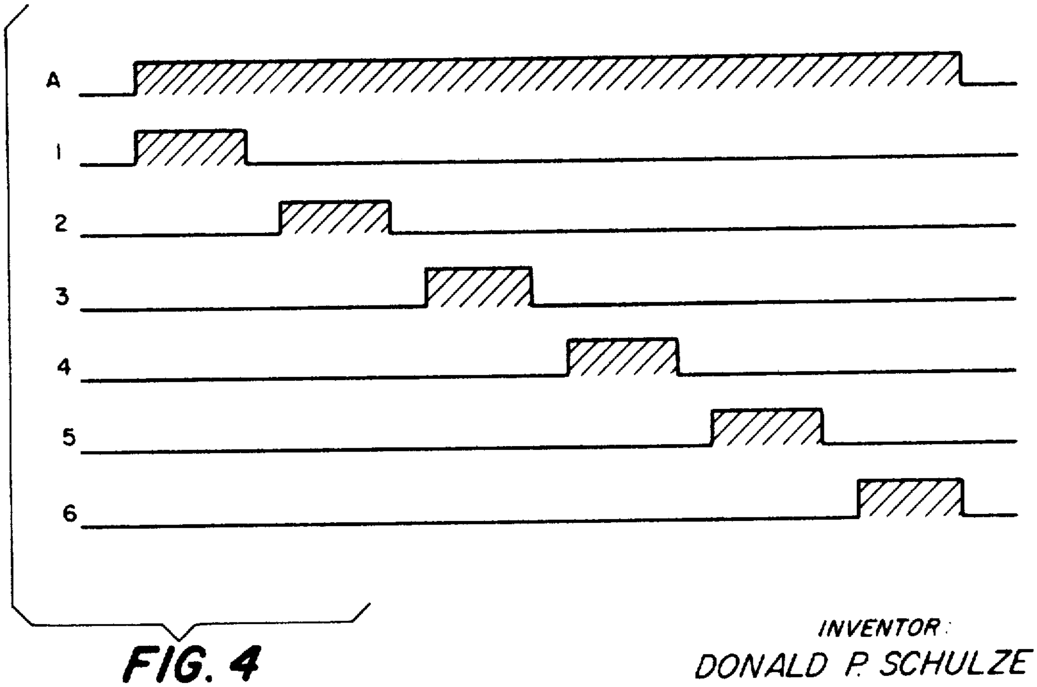
FIG. 4 is a second timing diagram showing the relationship between the timing pulse used to advance data through the shift register shown in FIG. 1 and the strobe pulses used to actuate the unloaders shown in FIG. 3.

The manner in which the unloaders are synchronized is shown in FIGS. 3 and 4. It will be noted that the space along the conveyor belt 20 is first broadly broken down into sections of equal length corresponding to each unloader, and indicated by the heavy lines 32, 34, 36, 38, and 40. Each one of these sections is further broken down within itself into six equal length subsections numbered 1 to 6. The unloaders 22, 24, 26, and 28 are each intentionally placed in different sections, and they are randomly located in different subsections. The unloader 22, for example, falls in the second subsection of the first section, while the unloader 24 fall in the fourth subsection of the second section. Strobe signals corresponding to each subsection are then generated and are supplied to each of the unloaders. FIG. 4 shows one arrangement of strobe signals or timing pulses which can be used to cause proper energization of the unloaders. At the top of FIG. 4, the A signal used to control the shifting of data within the shift register decoder 10 is shown. During the time interval when the A signal is positive, six strobe pulses equally spaced in time are generated. These are numbered 1 through 6. As mentioned above, the A signal goes negative to advance data through the shift register decoder each time the goods pass one of the heavy lines 32 through 38. While the goods on the conveyor 20 are within a first subsection, the signal labeled "1" is positive. While the goods are within a second subsection, the signal labeled "2" is positive. Similarly, when the goods are within any given subsection, the correspondingly numbered strobe or timing signal is positive. Hence, the strobe or timing signals shown in FIG. 4 can be used as an indication of when goods are within any given subsection. The timing signals are generated by an appropriate signal generator 42 (FIG. 3) and are applied to each of the unloaders 22 through 28. The particular timing signal fed to any given unloader is determined by the subsection within which that unloader happens to lie. For example, the unloader 22 is adjacent the second subsection, and therefore this unloader is supplied through a diode 44 with signal "2." The unloader 22 can be assumed to be a device that is actuated by a current sensing relay having a coil connected to the two terminals of the unloader. Assuming that goods are present which are to be unloaded by the unloader 22 when these goods reach the point 32, the switch 193A closes and supplies a ground level potential to one terminal of the unloader 22. The unloader is not yet actuated, because the signal "2" is still at ground level, as shown in FIG. 4. When the goods advance into the second subsection, signal "2" goes positive, and current flows through the relay coil within unloader 22. This causes the unloader 22 to unload the goods. The unloaders 24, 26, and 28 function in a similar manner. Thus, by combining the use of the shift register and decoder 10 with a plurality of strobe or timing signals, it is possible to fully automate the unloading of goods from a conveyor, such as the conveyor 20. Such a system is of great value for use in connection with a post office automated letter conveyor and sorter, for example. A zip code reading device is positioned at the location X, and letters are conveyed past the zip code reading device to a large number of unloaders positioned adjacent mail bags destined for different parts of the country.

While the conveyor and unloader system shown in FIG. 3 utilizes only six strobe pulses, it is to be understood that many more strobe pulses could be used if such an arrangement is desirable. Additionally, while the system is shown using individual strobing pulses representing equally spaced intervals of time, it would also be possible to replace the simple strobe signals by counter generated strobe signals and to arrange for each unloader to be actuated when the counter reaches a count that corresponds to the position of the unloader along the conveyor. Similar modifications can result in a system wherein the unloading of goods from a conveyor is performed with any desired degree of accuracy.

What is claimed as new and desired to be secured by Letters Patent of the United States is:

1. A shift register decoder comprising:

a plurality of multibit storage registers having inputs and outputs serially interconnected to form a shift register;

a decoding relay associated with each storage register; and a decoding circuit connecting the outputs of each storage register to a different one of the associated decoding relays, and arranged to control different ones of the decoding relays when specified binary numbers are presented by the outputs of the associated storage registers.

2. A shift register decoder in accordance with claim 1 wherein the decoding relay has 0 line and 1 line inputs, and wherein the decoding circuits comprise diodes connecting at least one output of each storage register to at least one of the decoding relay line inputs.

3. A shift register decoder in accordance with claim 2 wherein the storage register outputs presenting zero bits when the specified binary number is present are connected to the 0 line input to the decoding relay, and wherein a storage register output presenting a one bit when the specified binary number is present is connected to the 1 line input to the decoding relay.

4. A shift register decoder in accordance with claim 3 wherein the storage register includes a given stage for storing a most significant bit in the stored binary number, and the decoding circuit couples the output of said given stage to the 1 line input of the decoding relay.

5. A shift register decoder in accordance with claim 2 wherein the storage register outputs presenting one bits when the specified binary number is present are connected to the 1 line input to the decoding relay, and wherein a storage register output presenting a zero bit when the specified binary number is present is connected to the 0 line input to the decoding relay.

6. A shift register decoder in accordance with claim 1 wherein the decoding relay comprises a dual winding relay that is operable by current in either winding, but that is not operable by current in both windings.

7. A shift register decoder in accordance with claim 6 wherein the decoding relay has a 0 line input and a 1 line input, wherein the 0 line input connects to one of the relay windings, and wherein the 1 line input connects to the other of the relay windings.

8. A shift register decoder in accordance with claim 7 wherein the 0 line and 1 line inputs to each decoding relay are interconnected by a diode.

9. A shift register decoder in accordance with claim 8 wherein the decoding circuits comprise diodes connecting at least one output of each storage register to at least one of the decoding relay line inputs.

10. A shift register decoder in accordance with claim 1 and further including data erasure means associated with and energized by each decoding relay for erasing binary numbers from the shift register when the binary numbers have caused energization of the associated decoding relay.

11. A shift register decoder in accordance with claim 10, wherein:

the storage registers are grouped in accordance with their bit storage capacity;

the members of each storage register group are interconnected to form shift register sections; and the shift register sections are arranged serially in the order of the bit storage capacity of their component storage registers, and are interconnected to form a shift register having a decreasing bit capacity from beginning to end.

12. A shift register decoder in accordance with claim 11 wherein the storage registers include different numbers of storage register stages providing in each register a most significant binary bit storage stage, and the decoding circuits include means connecting to the members of a single storage register group to decode binary numbers having a 1 in the most significant bit storage stage.

13. A shift register decoder in accordance with claim 11 wherein the decoding circuits include means connecting the decoding relays to the members of a single storage register group to decode binary numbers in descending numerical order along the shift register section formed by the group.

14. A shift register decoder in accordance with claim 10 wherein each storage register includes capacitors for storing data during a data shift, and further including means associated with each decoding relay for preventing the storage of data in an adjacent set of capacitors when the decoding relay is energized, whereby data is erased from the shift register decoder once it has been decoded.

15. A decoder system for decoding binary numbers presented by a set of data lines, said decoder system comprising:

an exclusive OR logic element having first and second exclusive OR logic inputs and an exclusive OR logic output;

A first OR logic element having first and second OR logic inputs and a first OR logic output, said first OR logic input being connected to a first data line within the set, and said first OR logic output being connected to said first exclusive OR logic input; and a second OR logic element having any number of inputs connected to any number of the data lines within the set other than the first, and having a second OR logic output connected to said second exclusive OR logic input and also to said second OR logic input to the first OR logic element.

16. A decoder system in accordance with claim 15 wherein:

the exclusive OR logic element is a relay having first and second windings;

the first exclusive OR logic input is a lead from said first winding;

the second exclusive OR logic input is a lead from said second winding;

the exclusive OR logic output is the relay contacts; and the windings are arranged so that current flow into either exclusive OR logic input energizes the relay but simultaneous current flow into both exclusive OR logic inputs does not energize the relay.

17. A decoder system in accordance with claim 15 wherein each OR logic element comprises one or more diodes having cathode and anode terminals, said cathode terminals being interconnected to form the OR logic output, and said anode terminals forming the OR logic inputs.

18. A decoder system in accordance with claim 15 wherein each OR logic element comprises one or more diodes having cathode and anode terminals, said anode terminals being interconnected to form the OR logic output, and said cathode terminals forming the OR logic inputs.

19. A decoder system in accordance with claim 15 wherein the second OR logic element has no inputs, and comprises a node called the second OR logic output.

20. A decoder system in accordance with claim 15 wherein the second OR logic element has one input and comprises a single diode.

21. A shift register decoder comprising:

a plurality of multibit storage registers having inputs and outputs serially interconnected to form a shift register;

an exclusive OR decoding relay for each storage register, each relay having first and second windings;

a first OR logic element associated with each decoding relay and having first and second OR logic inputs and a first OR logic output, said first OR logic input being connected to a first output of the associated storage register, and said first OR logic output being connected to the first winding of said relay;

and a second OR logic element associated with each decoding relay having any number of inputs connected to outputs of the associated storage register other than the first, and having an OR logic output connected to the second winding of said relay and also to the second OR logic input to the first OR logic element for the same storage register.

22. A shift register decoder in accordance with claim 21 and further including data erasure means connecting each decoding relay to an adjacent storage register for erasing binary numbers from the shift register when the binary numbers have caused energization of the decoding relay.

23. A shift register decoder comprising:

a plurality of multibit storage registers having inputs and outputs serially interconnected to form a shift register, each of said storage registers being adapted to store a coded number;

a decoding relay associated with each storage register;

a decoding circuit connecting the outputs of each storage register to the associated decoding relay, and arranged to energize the decoding relays when specified coded numbers are presented by the associated shift registers; and data erasure means associated with and energized by each decoding relay for erasing coded numbers from the shift register when the coded numbers have caused energization of the associated decoding relay.

24. A control system for actuating a plurality of devices at precisely defined varying length time intervals after coded numbers corresponding to the devices are presented, said control system comprising:

a shift register decoder having an input into which code numbers can be periodically placed, and having a plurality of outputs each of which corresponds to a controlled device, and each of which is actuated a predetermined time interval after the code number for that device is placed into the input;

signal generating means providing timing signals which reoccur periodically and which are synchronized with the generation of said output signals so that an entire cycle of timing signals is generated during the time interval when one of said outputs is actuated;

and circuit means including selector means coupled to the signal generating means and the outputs of the decoder for connecting the output corresponding to a device to the device during the time interval when the device is to be actuated as determined by the timing signals selected by the selecting means.

25. A control system in accordance with claim 24, wherein the timing signals comprise a plurality of pulses spaced in time from one another and generated on separate conductors.

26. A control system in accordance with claim 25 wherein the circuit means comprises a circuit path from one of said conductors, through the device to be controlled and through an output of the decoder shift register, and back to a reference source of potential.

27. A control system in accordance with claim 26 wherein the output from said decoder shift register is a set of relay contacts, and wherein said device is actuated by current flow through current sensing means connected in series with said relay contacts between said pulse conductor and the reference potential source.

* * * * *